United States Patent [19]

Ikeou et al.

[11] Patent Number: 4,832,698
[45] Date of Patent: May 23, 1989

[54] AQUEOUS LIQUID COMPOSITION OF VINYLSULFONE TYPE REACTIVE DYES IN LITHIUM SALT FORM AND BUFFER

[75] Inventors: Shinei Ikeou, Hirakata; Takemi Tokieda, Nara; Noriaki Yamauchi, Hirakata; Kunihiko Imada, Sakai; Yutaka Kayane, Ibaraki, all of Japan

[73] Assignee: Sumitomo Chemical Company, Limited, Osaka, Japan

[21] Appl. No.: 35,864

[22] Filed: Apr. 8, 1987

[30] Foreign Application Priority Data

Apr. 18, 1986 [JP] Japan ................................. 61-90242

[51] Int. Cl.$^4$ ...................... C09B 62/51; C09B 67/26; D06P 1/38; C09D 62/51
[52] U.S. Cl. ............................................. 8/527; 8/549; 8/564; 8/639; 8/918; 8/937
[58] Field of Search ............... 8/527, 549, 937; 2/527, 2/549, 639

[56] References Cited

U.S. PATENT DOCUMENTS

| | | | |
|---|---|---|---|
| 3,723,056 | 3/1973 | Litke | 8/641 |
| 4,002,424 | 1/1977 | Smith | 8/527 |
| 4,118,184 | 10/1978 | Opitz et al. | 8/527 |
| 4,472,168 | 9/1984 | Gauthier | 8/527 |
| 4,472,168 | 11/1987 | Gauthier | 8/527 |
| 4,673,410 | 6/1987 | Sandefur et al. | 8/528 |
| 4,707,545 | 11/1987 | Meininger et al. | 534/588 |

FOREIGN PATENT DOCUMENTS 208968 1/1987 European Pat. Off. .
61-073772 4/1986 Japan .

*Primary Examiner*—A. Lionel Clingman
*Attorney, Agent, or Firm*—Stevens, Davis, Miller & Mosher

[57] ABSTRACT

An aqueous liquid dye composition comprising a dye represented by the following formula in a free acid form,

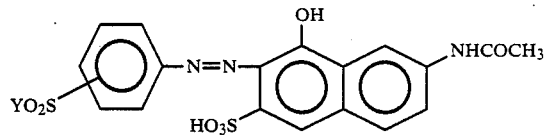

wherein Y is —CH=CH$_2$ or —CH$_2$CH$_2$X in which X is a group splittable by the action of an alkali, and a pH buffer, the dye being in the form of a lithium salt, and the liquid dye composition having a pH value of from 3 through 7 and a dye content of from 5 through 50% by weight based on the weight of the liquid dye composition, which can be stored stably for a long period of time even at a low temperature such as 0° C. or lower, and a high temperature such as 40° C. or higher.

7 Claims, No Drawings

AQUEOUS LIQUID COMPOSITION OF VINYLSULFONE TYPE REACTIVE DYES IN LITHIUM SALT FORM AND BUFFER

The present invention relates to an aqueous liquid composition of an anionic dye. More specifically, the present invention relates to an aqueous liquid composition of a vinylsulfone type reactive dye excellent in storage stability.

Industrial dyeing or printing of fiber materials with anionic dyes has been carried out usually in an aqueous medium. Therefore, the anionic dyes commercially available in the form of powder or granule must be dissolved in the aqueous medium using hot water, when used for the dyeing or printing.

In recent years, dyeing or printing systems in a dye house have been eagerly required to be made into a form suitable for an automatic weighing and dispensing system.

An aqueous liquid composition of the dye is now considered to be very favorable, because it is suitable for the automatic weighing and dispensing system and causes no powder-scattering on the handling, resulting in no pollution of a working environment, and moreover it can serve saving energy and labor. Thus, it has been increasingly required to manufacture an aqueous liquid dye composition without any problem from industrial point of view.

As well known, the aqueous liquid dye composition can be relatively easily manufactured, where the dye has a high solubility in water. However, there are many anionic dyes insufficient in the solubility. In order to improve the solubility of such dyes, there have heretofore been proposed to use a hydrotropic agent as disclosed in Published Examined Japanese Patent Application No. 8369/1984, and to effect demineralization by passing an aqueous dye solution through a reverse osmotic membrane as disclosed in Published Unexamined Japanese Patent Application No. 16522/1972.

Meanwhile, vinylsulfone type reactive dyes having the following formula (I) in a free acid form,

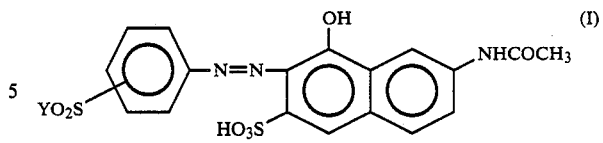

(I)

where Y is —CH=CH$_2$ or —CH$_2$CH$_2$X in which X is a group splittable by the action of an alkali or a halogen atom, which are known as C.I. Reactive Orange 7, C.I. Reactive Orange 16 and the like, have been manufactured industrially in the form of a sodium or potassium salt, and widely used for dyeing or printing fiber materials, particularly cellulose fiber materials. However, all of said reactive dyes are low in the solubility, so that an aqueous liquid dye composition having a low content of the dye, which is therefore of no value from industrial viewpoint, can only be obtained even in the conventional manners such as addition of hydrotropic agents or demineralization. Moreover, the aqueous liquid dye composition obtained in such manners has drawbacks such that it is easy to precipitate the dye crystals at a relatively low temperature such as 10° C. or lower, under conditions of which the dye composition may often be shipped or stored, or it is easy to deteriorate the dye contained therein or change the liquid state at a relatively high temperature such as 40° C. or higher, even though such liquid dye composition is stable at ordinary temperature.

The present inventors have undertaken extensive studies to solve the problems as described above, and found that the problems can be solved by providing an aqueous liquid composition comprising the dye of the formula (I) in the form of a lithium salt and a pH buffer, the composition being controlled within a specific pH range.

The present invention provides an aqueous liquid dye composition comprising the dye represented by the aforesaid formula (I) in a free acid form and a pH buffer, the dye being in the form of a lithium salt, and the liquid dye composition having a pH value of from 3 through 7 and a dye content of from 5 through 50% by weight based on the weight of the liquid dye composition.

In the present invention, the dye of the formula (I) in the form of a lithium salt can be used in each alone or preferably in a mixture of two or more.

Examples of the dye usable in the present invention are as follows.

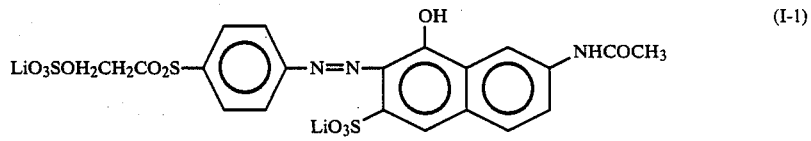

(I-1)

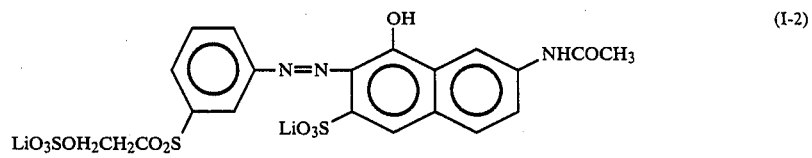

(I-2)

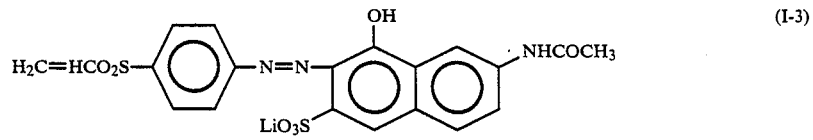

(I-3)

-continued

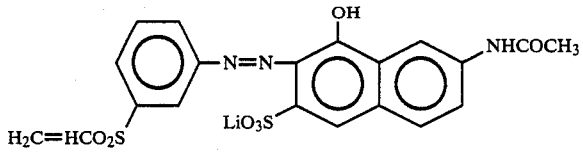 (I-4)

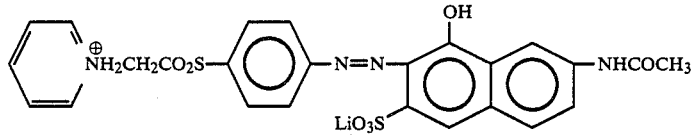 (I-5)

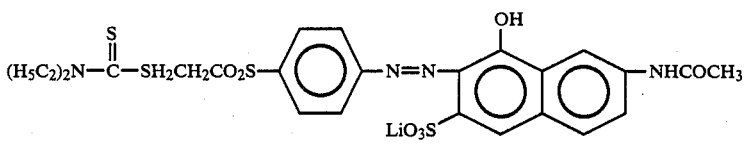 (I-6)

Of these dyes, the sulfuric acid ester type dyes of the formula (I-1) and (I-2) are preferably used in each alone or preferably in a mixture of the two. The ester type dyes (I-1) and (I-2) may contain their corresponding vinylsulfone type dyes (I-3) and (I-4), respectively. In the present invention, a mixture of the ester type dyes (I-1) and (I-2) and the vinylsulfone types dyes (I-3) and (I-4) is preferably used. In this case, the weight ratio of the ester type dyes to the vinylsulfone types dyes ranges from 98:2 to 70:30, preferably from 95:5 to 75:25.

The dye represented by the formula (I) in a free acid form is already known and can be produced in a conventional manner such as coupling between a diazonium salt of an amine represented by the following formula (II),

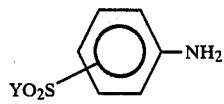 (II)

wherein Y is as defined above, and a coupler represented by the following formula (III)

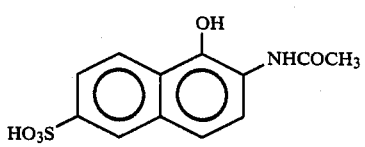 (III)

which is hereinafter referred to as acetyl γ-acid.

In preparing a lithium salt of the dye, a lithium salt of acetyl γ-acid can be used for the coupling reaction, or the dye once produced in the form of a sodium or potassium salt in a conventional manner can be subjected to salt exchange using a lithium compound such as lithium hydroxide, lithium carbonate and the like.

In producing the aqueous liquid dye composition of the present invention, a dye-containing reaction mixture obtainable through the production process of the dye can be used as it is. Alternatively, a wet cake obtainable by salting out the dye-containing reaction mixture, followed by filtration, or a powder obtainable by drying the web cake, followed by pulverization, can be used in the form of its aqueous solution prepared by dissolving it in water.

The content of the lithium salt of the dye ranges from 5 to 50% by weight, preferably from 15 to 40% by weight based on the weight of the aqueous liquid composition.

The pH buffers usable in the present invention are at least one member selected from those derived from carboxylic acids and phosphoric acids. Particularly preferred are those derived from carboxylic acids. Examples of those derived from carboxylic acids are sodium, potassium and lithium salts of acetic acid, citric acid, oxalic acid, malic acid, malonic acid, phthalic acid and the like. The content of the buffer including those by-produced, if any, in the production process of the dye ranges from 0.1 to 10% by weight, preferably from 0.5 to 5% by weight, based on the weight of the liquid dye composition.

The pH of the aqueous liquid dye composition can be controlled with a range of from 3 through 7, preferably from 4 through 6, by the addition of usual alkalis or acids after or before incorporation of the buffer.

The aqueous liquid dye composition in accordance with the present invention can additionally comprise a lactam such as ε-caprolactum, γ-caprolactam, δ-caprolactam, γ-valerolactam, γ-butyrolactam and the like. Of these lactams, particularly preferred is ε-caprolactam. The content of the lactam ranges from 0.1 to 20% by weight, preferably from 1 to 5% by weight, based on the weight of the dye composition.

The thus prepared aqueous liquid dye composition of the present invention can be subjected to removal of inorganic salts which are by-products produced in the course of production process of the reactive dyes and/or the aqueous liquid dye composition (the removal being hereinafter referred to as demineralization). The demineralization can be carried out preferably by passing the liquid dye composition through a reverse osmotic membrane to lower the content of inorganic salts. The reverse osmotic membrane usable in the present invention is the one capable of permeating water and low molecular weight solutes such as inorganic salts including sodium chloride, sodium sulfate, lithium chloride, lithium sulfate and the like, and of rejecting the permeation of relatively high molecular weight solutes such as dyes and their isomeric substances. Such membrane is preferably asymmetric, and has 1 to 500 Å in its pore size and 25 to 95%, preferably 60 to 90%, in a rejection percent of a 0.5% aqueous sodium chloride solution, and is made up of cellolose acetate, polyvinylalcohol, polyacrylonitrile and the like. Of these, preferred is the one made up of polyacrylonitrile.

In order to improve the solubility and particularly the low temperature storage stability of the present liquid dye composition much more, it is preferred to effect the demineralization so as to make each content of inorganic salts in the form of sodium chloride, lithium chloride, sodium sulfate and lithium sulfate 1% by weight or less, respectively. More preferably, the demineralization is effected to make the total content of the inorganic salts 1% by weight or less.

The aqueous liquid dye composition in accordance with the present invention is improved in the solubility in water to a great degree, so that the liquid dye composition can be stored for a long period of time, preferably in a closed vessel, even at a lower temperature such as 0° C. or lower, or a high temperature such as 40° C. or higher without chemical and physical changes. Even after the storage, the present liquid dye composition can be used for dyeing or printing natural or synthetic fiber materials, particularly such as paper, cellulose fibers, polyamide fibers, wools and the like in a conventional manner, thereby giving dyed or printed products which are equal to those obtained using the reactive dye in the form of powder or granule.

The present invention is illustrated in more detail with reference to the following Examples, which are only illustrative and not intended to limit the scope of the present invention. In Examples, parts and % are by weight.

EXAMPLE 1

Into water (400 parts) of 20° C. was added γ-acid (119 parts), and then lithium hydroxide (12 parts) was added thereto to adjust the pH within 7 to 8, thereby forming a clear solution. Thereafter, acetic anhydride (58 parts) was slowly added to the solution over 1 hour, and the mixture was stirred for 1 hour.

On the other hand, into water (500 parts) of 20° C. were added 4-β-sulfatoethylsulfonyl-aniline (140 parts) and 35% hydrochloric acid (52 parts). 35% Aqueous sodium nitrite solution (99 parts) was dropwise added thereto over 30 minutes at 5° to 10° C., and the mixture was stirred for 1 hour at that temperature to perform diazotization.

The resulting diazonium solution was added to the above acetyl γ-acid-containing reaction mixture over 1 hour, while controlling the temperature within 5° to 10° C. Thereafter, the reaction mixture was adjusted to pH 5.0 using lithium hydroxide to obtain a liquid composition (1850 parts) containing the dye of the formula (I-1) described above.

Sodium acetate (1 part) was added, and then water was added to the composition to make the dye content 15%. Thus, a desired liquid dye composition was obtained.

The liquid dye composition was found to be stable for 6 months or more at 20° C., 1 month or more at 0° C., and 2 weeks at 60° C., respectively.

Using the liquid dye composition which had been stored for 6 months at 40° C., a dyeing bath, padding liquor and printing paste having each predetermined dye concentration were prepared in each conventional manner respectively. Using them, cotton was dyed to obtain each dyed product of an orange color with a good dyeing affinity, which was not different from those dyed using a dye bath, padding liquor and printed paste having the same dye concentration as above which were prepared using the pulverulent dye of the formula (I-1).

EXAMPLE 2

Example 1 was repeated, provided that an aqueous liquid composition containing the dye of the formula (I-2) described above was prepared using 3-β-sulfatoethylsulfonyl-aniline.

The liquid composition was subjected to demineralization and concentration using an asymmetric reverse osmotic membrane having 80% in the rejection percent of 0.5% aqueous sodium chloride solution, then obtaining a liquid composition having less than 0.1, 0.2, 0.1 and 0.3% in the content of NaCl, Na$_2$SO$_4$, LiCl and Li$_2$SO$_4$, respectively. ε-Caprolactum (5 parts) and sodium malonate (2 parts) were added thereto, and the liquid composition was adjusted to pH 5.5 using lithium carbonate to obtain a desired aqueous liquid dye composition having 20% in the dye content.

The liquid dye composition was found to be stable in a closed vessel for 6 months or more at 20° C., 1 month or more at 0° C. and 6 months or more at 40° C., respectively, Using the liquid dye composition which had been stored for 6 months at 40° C., cotton was dyed in a conventional manner to obtain a dyed product of an orange color with a good dyeing affinity, which was not different from that dyed using a pulverulent dye of the formula (I-2).

EXAMPLE 3

Into water (400 parts) of 20° C. was added γ-acid (119 parts), and then lithium carbonate (37 parts) was added thereto to adjust the pH within 7 to 8, thereby forming a clear solution. Thereafter, acetic anhydride (58 parts) was slowly added to the solution over 1 hour, and the mixture was stirred for additional 1 hour.

On the other hand, into water (500 parts) of 20° C. were added 4-β-sulfatoethylsulfonyl-aniline (126 parts), 3-β-sulfatoethylsulfonyl-aniline (14 parts), and then 35% hydrochloric acid (52 parts). 35% Aqueous sodium nitrite solution (99 parts) was dropwise added thereto at 5° to 10° C., and the mixture was stirred for 1 hour to perform diazotization.

The resulting diazonium solution was dropwise added to the above acetyl γ-acid-containing reaction mixture over 1 hour, while controlling the temperature within 5° to 10° C., and the mixture was stirred for 1 hour at that temperature. Thereafter, lithium carbonate was added to the reaction mixture to adjust the pH 5.3 to obtain a liquid composition.

The liquid composition was subjected to salting out using lithium chloride (400 parts), followed by demineralization using an asymmetric reverse osmotic membrane made up of polyacrylonitrile having 90% in the rejection percent of a 0.5% aqueous sodium chloride solution, obtaining a liquid composition having less than 0.1, 0.1 and 0.1% in the content of NaCl, Na$_2$SO$_4$ and LiCl, respectively, Sodium citrate (3 parts) was added thereto and the liquid composition was adjusted to pH 5.1 using lithium carbonate, obtaining a desired aqueous liquid dye composition having 15% in the dye content.

The liquid dye composition was found to be stored stably in a closed vessel for 6 months or more at 20° C., 1 month or more at 0° C., and 6 months or more at 40° C.

Using the liquid dye composition which had been stored for 6 months at 40° C., cotton was dyed in a conventional manner to obtain a dyed product of an orange color with a good dyeing affinity, which was not different from that dyed using the corresponding dye in the pulverulent form.

EXAMPLES 4 TO 14 AND COMPARATIVE EXAMPLES 1 TO 3

In a manner similar to that of Example 1, each aqueous liquid dye composition was obtained, provided that sodium citrate (3 parts) as the buffer and ε-caprolactum (2.5 parts) were added, the pH was adjusted to 5.3, and the treatment with the membrane was applied in a manner similar to that of Example 3.

The test of storage stability and the dyeing after the storage were carried out in a manner similar to that of Example 3.

Results are shown in the following table, in which the marks of − and o in the column of treatment with membrane denote no-treatment and treatment, respectively, the marks of o, Δ and x in the column of storage stability, denote a good storage stability, some precipitates and marked precipitates, respectively, and the marks of o and − in the column of dyeing after the storage denote a favorable result and no testing, respectively.

TABLE

| Example | Dye used | Alkali used for salt formation of dye | Salt used for salting out | Treatment with membrane | Storage stability 0° C. | Storage stability 40° C. | Dyeing after storage |
|---|---|---|---|---|---|---|---|
| 4 | I-3 | LiOH | — | — | o | o | o |
| 5 | I-3 | LiOH | LiCl | o | o | o | o |
| 6 | I-3 | Li₂CO₃ | — | o | o | o | o |
| 7 | I-4 | Li₂CO₃ | LiCl | o | o | o | o |
| 8 | I-4 | Li₂CO₃ | — | o | o | o | o |
| 9 | I-5 | LiOH | LiCl | o | o | o | o |
| 10 | I-5 | Li₂CO₃ | — | o | o | o | o |
| 11 | I-6 | LiOH | LiCl | o | o | o | o |
| 12 | I-6 | Li₂CO₃ | — | o | o | o | o |
| 13 | Same as in Exp. 3 | LiOH | LiCl | o | o | o | o |
| 14 | Same as in Exp. 3 | LiOH | — | o | o | o | o |
| Comparative example 1 | I-1 Same as in Exp. 3 | NaOH | NaCl | o | x | x | — |
| Comparative example 2 | I-1 | Na₂CO₃ | NaCl | o | x | Δ | — |
| Comparative example 3 | I-2 | NaOH | NaCl | o | x | x | — |

What is claimed is:

1. An aqueous liquid dye composition comprising a dye mixture of ester dyes represented by the following formulas in their free acid forms,

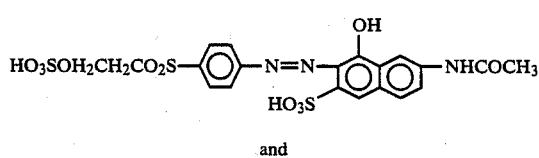

and

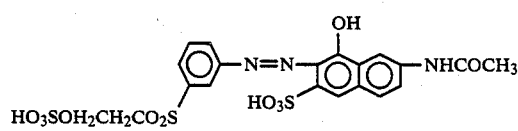

and vinylsulfone dyes represented by the following formulas in their free acid forms,

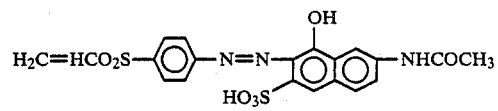

and

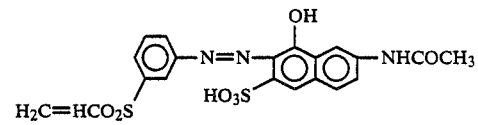

and a pH buffer, each dye represented by the above formulas being in the form of a lithium salt, and the liquid dye composition having a pH value of from 3 through 7 and a dye content of from 5 to 50% by weight based on the weight of the liquid dye composition.

2. An aqueous liquid dye composition according to claim 1, wherein the weight ratio of the ester type dyes to the vinylsulfone type dyes ranges from 98:2 to 70:30.

3. An aqueous liquid dye composition according to claim 1, wherein the buffer is at least one member selected from those derived from carboxylic acids and phosphoric acids.

4. An aqueous liquid dye composition according to claim 3, wherein the buffers derived from carboxylic acids are sodium, potassium and lithium salts of acetic acid, citric acid, oxalic acid, malic acid, malonic acid and phthalic acid.

5. An aqueous liquid dye composition according to claim 1, wherein the content of the buffer is from 0.1 to 10% by weight based on the weight of the liquid dye composition.

6. An aqueous liquid dye composition according to claim 1, wherein the liquid dye composition contains a lactam selected from ε-caprolactam, γ-caprolactam, δ-caprolactum, γ-valerolactam and γ-butyrolactam in an amount of 0.1 to 20% by weight based on the weight of the liquid dye composition.

7. An aqueous liquid dye composition according to claim 1, wherein the liquid dye composition contains inorganic salts in each amount of 1% of weight or less in the form of sodium chloride, lithium chloride, sodium sulfate or lithium sulfate, based on the weight of the liquid dye composition.

* * * * *